United States Patent
Takeda et al.

(10) Patent No.: US 9,107,149 B2
(45) Date of Patent: Aug. 11, 2015

(54) WIRELESS PORTABLE COMPUTER CAPABLE OF AUTONOMOUSLY ADJUSTING LOAD OF WIRELESS BASE STATION

(75) Inventors: Hajime Takeda, Kawasaki (JP); Kozo Matsunaga, Yokohama (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 1182 days.

(21) Appl. No.: 13/049,999

(22) Filed: Mar. 17, 2011

(65) Prior Publication Data

US 2011/0249622 A1 Oct. 13, 2011

(30) Foreign Application Priority Data

Apr. 7, 2010 (JP) ................................ 2010-088300

(51) Int. Cl.
*H04W 48/20* (2009.01)
*H04W 24/00* (2009.01)

(52) U.S. Cl.
CPC .............. *H04W 48/20* (2013.01); *H04W 24/00* (2013.01)

(58) Field of Classification Search
None
See application file for complete search history.

(56) References Cited

FOREIGN PATENT DOCUMENTS

| JP | 11-018130 | | 1/1999 |
|---|---|---|---|
| JP | 2000-295650 | | 10/2000 |
| JP | 2002-359864 | | 12/2002 |
| JP | 2004/004226 A2 | | 1/2004 |
| JP | 2004-186797 | | 7/2004 |
| JP | 2004186797 | * | 7/2004 |
| JP | 2005-079827 | | 3/2005 |
| JP | 2005-354646 | | 12/2005 |
| JP | 2007-158765 | | 6/2007 |
| JP | 2009-124461 | | 6/2009 |

* cited by examiner

*Primary Examiner* — Jae Y Lee
*Assistant Examiner* — Tito Pham
(74) *Attorney, Agent, or Firm* — Antony P. Ng; Russell Ng PLLC

(57) ABSTRACT

A method for allowing a portable computer to adjust the load of a wireless base station autonomously is disclosed. The portable computer can communicate in an infrastructure mode and an ad-hoc mode. The portable computer includes a traffic table for storing the performance of various wireless stations and the traffic of other portable computers. Each portable computer measures its traffic to a wireless base station. Then, the portable computer transmits the measured traffic to the other portable computers in the ad-hoc mode and receives the traffic of the other portable computers. A newly connected portable computer acquires the traffic in the ad-hoc mode. When the newly connected portable computer enters into a cell overlap area to connect to any wireless base station, the newly connected portable computer selects a wireless base station having little traffic based on the performance and traffic of wireless base stations instead of a wireless base station that provides a stronger radio field.

17 Claims, 6 Drawing Sheets

| ITEM | | MAC ADDRESS | AVERAGE TRAFFIC | ROAMING FLAG |
|---|---|---|---|---|
| SSSID (AP20) | | aa-bb-cc-dd-ee-ff | | |
| MAXIMUM CONNECTABLE NUMBER | 30 | | | |
| THRESHOLD CONNECTABLE NUMBER | 28 | | | |
| THROUGHPUT | 800 | | | |
| THRESHOLD TRAFFIC | 700 | | | |
| STA20-1 | | aa-bb-cc-dd-ee-f1 | 100 | |
| STA20-3 | | aa-bb-cc-dd-ee-f2 | 150 | |
| STA20-5 | | aa-bb-cc-dd-ee-f3 | 150 | |
| STA41 | | aa-bb-cc-dd-ee-f4 | 300 | |
| STA100 | | aa-bb-cc-dd-ee-f5 | 50 | |
| SUM OF AVERAGE TRAFFIC | 750 | | | |
| PRESENT TOTAL CONNECTED NUMBER | 5 | | | |
| | | | | |
| SSID(AP30) | | 00-11-22-33-44-55 | | |
| MAXIMUM CONNECTABLE NUMBER | 25 | | | |
| THRESHOLD CONNECTABLE NUMBER | 23 | | | |
| THROUGHPUT | 600 | | | |
| THRESHOLD TRAFFIC | 500 | | | |
| STA30-1 | | aa-bb-cc-dd-ee-f6 | 80 | |
| STA30-3 | | aa-bb-cc-dd-ee-f7 | 0 | |
| STA30-5 | | aa-bb-cc-dd-ee-f8 | 40 | |
| STA43 | | aa-bb-cc-dd-ee-f9 | 100 | ○ |
| SUM OF AVERAGE TRAFFIC | 220 | | | |
| PRESENT TOTAL CONNECTED NUMBER | 4 | | | |

FIG. 5

WIRELESS PORTABLE COMPUTER CAPABLE OF AUTONOMOUSLY ADJUSTING LOAD OF WIRELESS BASE STATION

PRIORITY CLAIM

The present application claims benefit of priority under 35 U.S.C. §§120, 365 to the previously filed Japanese Patent Application No. JP2010-088300 entitled, "Wireless terminal capable of autonomously adjusting load of wireless base station" with a priority date of Apr. 7, 2010, which is incorporated by reference herein.

BACKGROUND

1. Technical Field

The present invention relates to portable computers in general, and in particular to a method for adjusting the load of a wireless base station. More particularly, the present invention relates to a method for allowing a wireless portable computer to adjust the load of a wireless base station autonomously.

2. Description of Related Art

Wireless terminals such as notebook-type portable computers (laptop PCs) or personal digital assistants (PDAs) have a wireless LAN communication device mounted therein and are capable of communicating with a server or other laptop PCs through a wireless base station. Moreover, in a wireless LAN network, multiple wireless base stations is disposed so that the ranges of radio coverage partially overlap with each other. The wireless terminal has a fallback function that automatically decreases a transmission rate so that the communication is not disconnected in order to perform signal processing of noise separated from the signals when the radio field intensity is weak. Thus, when multiple wireless base stations is detected to be connectable, the wireless terminal is configured to automatically connect to a wireless base station which provides the highest radio field intensity and from which a high transmission rate can be expected. Therefore, in a building where the wireless LAN network is installed, when many users carrying their wireless terminals gather in a certain space such as a meeting room, the connection is concentrated on a specific wireless base station which provides a strong radio field.

The number of wireless terminals connectable to one wireless base station is generally limited by the number of IP addresses assigned through the wireless base station. Although the IP addresses are automatically assigned by a DHCP server, a network administrator limits the number of IP addresses handled by a specific wireless base station from the perspective of managing security or the like. Therefore, the number of host addresses that are actually handled by a wireless base station is far smaller than the theoretical number defined in the global address class. Moreover, in some cases, the network administrator limits the number of wireless terminals connected to a specific wireless base station at the same time in order to maintain throughput. Since the IEEE 802.11 standards have no regulations on the time when roaming or disconnection occurs, a wireless terminal having connected to a specific wireless base station generally tends to maintain the connection unless it moves or is suspended. As a result, a number of wireless terminals which do not actually transmit data are connected to a specific wireless base station. Therefore, a wireless terminal which needs to transmit data is unable to connect to the specific wireless base station.

Moreover, even when multiple wireless terminals is connected to a specific wireless base station, only one wireless terminal can actually communicate with the wireless base station at a certain point in time. In order to avoid a collision of frames, the other wireless terminals perform carrier sensing and wait until a wireless channel enters an idle state and then transmit data. Therefore, if the number of wireless terminals connected to a specific wireless base station increases or the transmission of data from the respective wireless terminals is concentrated at a certain point in time, the overall transmission rate of all the wireless terminals connected to the wireless base station decreases. In addition, in the case of a collision of frames, the wireless terminal is unable to receive an ACK frame representing an acknowledgement from the wireless base station, the wireless terminal has to transmit the same data again, which further decreases the transmission rate.

As described above, when a number of wireless terminals connected to a specific wireless base station perform data transmission at the same time, the traffic (unit: bps) which is the quantity of data transmitted per unit period by the respective wireless terminals decreases. Thus, it becomes impossible to perform comfortable wireless communication. In a wireless base station, the throughput (unit: bps) which represents the quantity of data transmitted per unit period is set. For the respective wireless terminal to maintain a predetermined range of transmission rates, it is preferable to adjust the total traffic so that the throughput of the wireless base station has a predetermined margin with respect to the total traffic of the respective wireless terminal.

SUMMARY

In accordance with a preferred embodiment of the present invention, a laptop computer initially acquires performance information representing a performance of multiple wireless base stations that form a cell overlap area to which multiple wireless terminals is connected. The laptop computer is capable of communicating in an infrastructure mode and an ad-hoc mode to allow the laptop computer to connect to any one of the wireless base stations. Before connecting to any one of the wireless base stations in the cell overlap area, the laptop computer communicates with the wireless terminals in the ad-hoc mode to receive connection information representing respective connection states of the wireless terminals to the wireless base stations. Based on the performance information and the connection information, the laptop computer selects one of the wireless base station as a candidate for making a wireless connection. The laptop computer subsequently connects to the selected wireless base station.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 5 is a diagram showing a data structure of a traffic table;

DETAILED DESCRIPTION OF A PREFERRED EMBODIMENT

A. Configuration of Wireless LAN System

Figure 1:
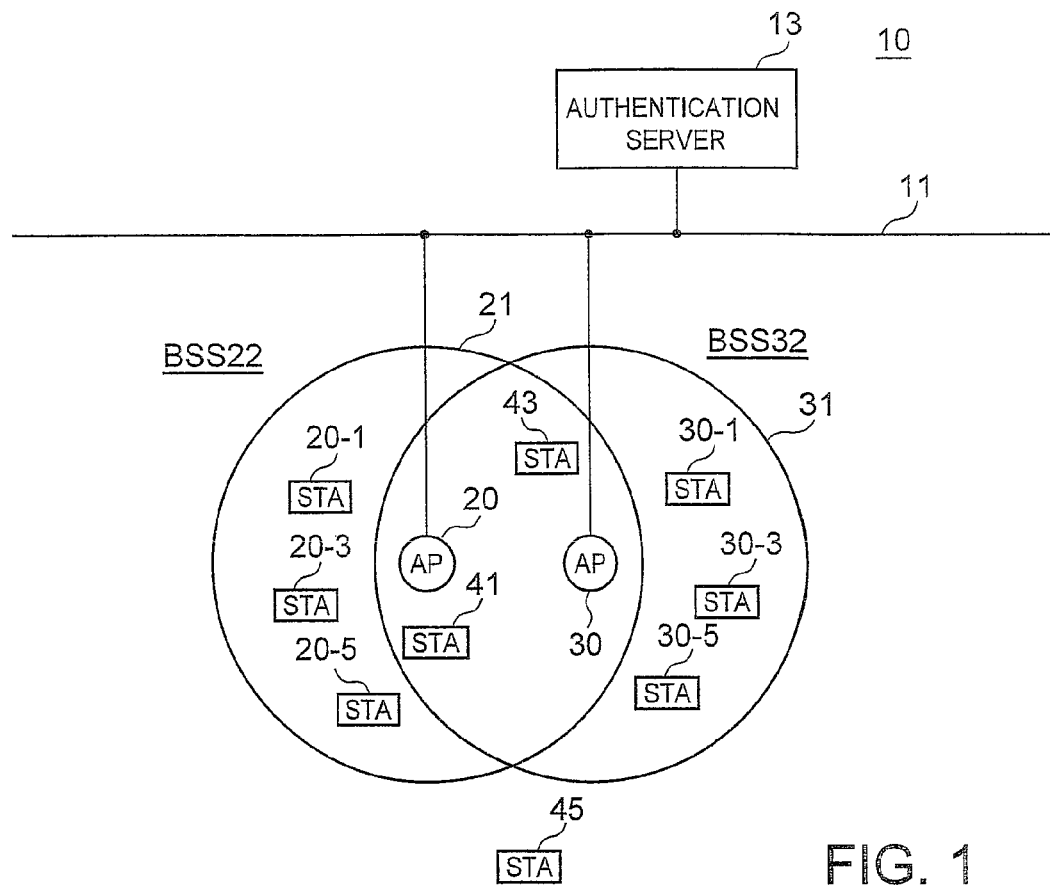
FIG. 1 is a diagram showing a network configuration of an infrastructure mode wireless LAN system.

FIG. 1 is a diagram showing a network configuration of a wireless LAN system 10 employing an infrastructure mode (infra mode) defined by the IEEE 802.11 standards. FIG. 1 shows a representative example in which an authentication server 13, a wireless base station or an access point (AP) 20, and an AP 30 are connected to a backbone network 11 of the Ethernet. However, actually, various servers such as a Web server, a mail server, a DNS server, and a database server are connected to the backbone network 11. An area defined as the range of radio coverage served by one AP is called a cell. FIG. 1 shows a cell 21 of the AP 20 and a cell 31 of the AP 30. The cells 21 and 31 include an overlap area. An area in which cells overlap one another is called a cell overlap area. When three or more APs are disposed, the cell overlap area may be formed by three or more cells. Moreover, an area in which the cell overlap area is excluded from each cell is called a cell exclusive area.

The wireless LAN system 10 includes multiple wireless terminals or stations (STAs). A laptop PC can be used as a STA as an example. The STAs 20-1, 20-3, and 20-5 present in the exclusive area of the cell 21 and the STA 41 present in the cell overlap area are connected to the AP 20. The STAs 30-1, 30-3, and 30-5 present in the exclusive area of the cell 31 and the STA 43 present in the cell overlap area are connected to the AP 30. The STA 45 does not belong to any cell and is not connected to the wireless LAN system 10. All STAs shown in FIG. 1 possess the SSIDs of the respective APs connected to the wireless LAN system 10 and are registered in the authentication server 13 as authorized clients by their identifiers.

Moreover, the authentication server 13 and the respective STAs possess a shared key which is used in authentication and data encryption. Therefore, when connected to any one of the APs, each STA can be authenticated by the authentication server 13 and can communicate through the backbone network. The APs 20 and 30 possess a known DHCP server (not shown) for assigning an IP address to an STA from which an access request is received. There is a limit to the number of IP addresses assigned by each DHCP server. Moreover, a network administrator puts a limit to the number of STAs that can be connected to each of the APs 20 and 30 at the same time.

Each STA can connect to any one of the APs 20 and 30 as long as it is present in the cell area. Therefore, the STA 41 present in the cell overlap area can connect to the AP 30, and the STA 43 can connect to the AP 20. Hitherto, in order to determine an AP to which the STAs 41 and 43 present in the cell overlap area are connected, each STA compares Received Signal Strength Indications (RSSIs) representing the radio field intensity of a beacon frame received from the respective APs and selects an AP having a strong radio field intensity as its connecting destination. If the performances of the respective APs are the same, all general STAs are configured to connect to an AP having a strong radio field intensity since a high transmission rate can be obtained.

Therefore, in some case, a number of STAs are connected to a specific AP, the total traffic of the respective STAs becomes close to the throughput of the AP, and the traffic of the respective STAs decreases. Moreover, an STA which enters into a cell exclusive area and newly connects to an AP may be unable to connect to the AP since the number of STAs connected to the AP is saturated. In the present invention, as described later, an algorithm of allowing the respective STAs to autonomously realize the load balancing of the AP. In this description, it is assumed that the STA 41 is connected to the AP 20, and the STA 43 is connected to the AP 30.

A collective entity made up of the AP 20 and the STAs 20-1, 20-3, 20-5, and 41 which have established their logical connection with the AP 20 is referred to as a basic service set (BSS). Similarly, the AP 30 and the STAs 31-1, 30-3, 30-5, and 43 forms another BSS. The BSS including the AP 20 will be denoted by a BSS 22, and the BSS including the AP 30 will be denoted by a BSS 32. An STA that newly participates in any one of the BSSs searches for the SSIDs of connectable APs by an active scanning method a passive scanning method. When an STA which is connected to any one of the APs and is present in the cell exclusive area is moving across the cells 21 and 31 and is entering into the cell overlap area, the STA is also connectable to other APs.

If the radio field intensity of an AP to which the STA is presently connected weakens when the STA is moving in the cell overlap area, its connecting AP is automatically changed while maintaining an existing session. An operation of the STA changing its connecting AP is called roaming or handover. When the STA changes its connecting AP, an IP address is assigned by a DHCP server of the new AP after change, and the IP address assigned by a DHCP server of the previous AP before change is released and can be assigned to other STAs.

Figure 2:
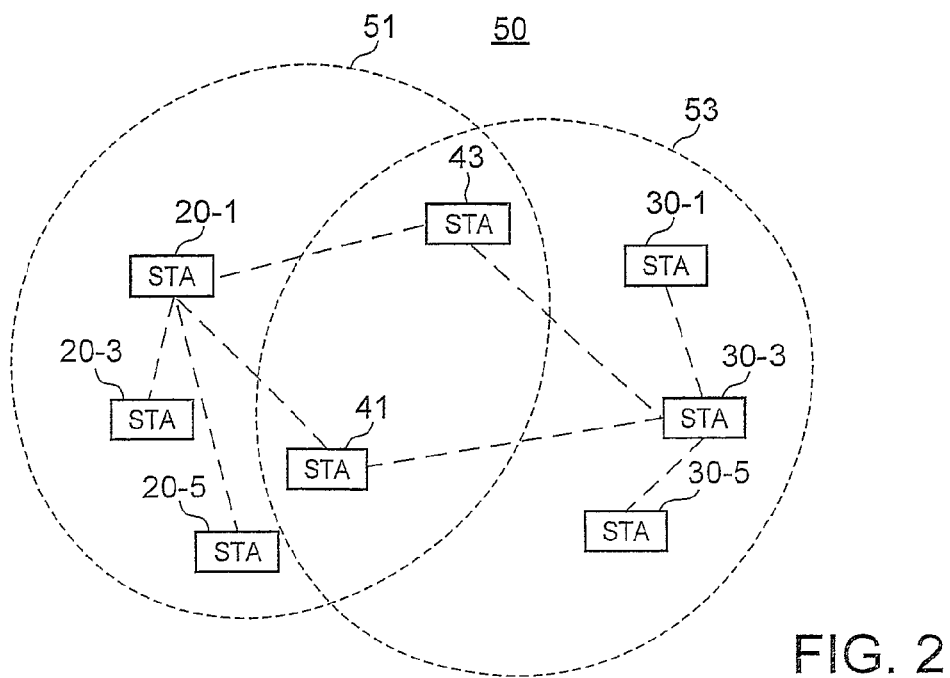
FIG. 2 is a diagram showing a network configuration of an ad-hoc mode wireless LAN system.

FIG. 2 is a diagram showing a network configuration of a wireless LAN system employing an ad-hoc mode defined by the IEEE 802.11 standards. Each STA can communicated with each other by connecting to the backbone network 11 in the infra mode and can also perform wireless communication with each other by constructing an ad-hoc mode network (or an ad-hoc network). In the ad-hoc mode, the STAs can communicate directly with each other without through an AP. A collective entity made up of multiple STAs capable of communicating with each other in the ad-hoc mode is referred to as an independent basic service set (IBSS). The IBSS is independent from a BSS and can be configured to include STAs belonging to multiple BSSs.

The ad-hoc network can be constructed by any STA that initiates communication with other STAs. The ad-hoc network is formed between respective STAs which are present within the range of radio coverage of the STA having constructed the ad-hoc network. FIG. 2 shows an ad-hoc network 51 constructed by the STA 20-1 and an ad-hoc network 53 constructed by the STA 30-3. The STAs 20-1 and 30-3 which are not present in the same ad-hoc network cannot communicate directly with each other. However, the shared information described later such as the performance information of APs and the connection information of STAs with respect to the APs can be exchanged through the STA 41 or 43 which is the member of the two ad-hoc networks 51 and 53.

In the present invention, each STA has a unified communication channel and SSID and possesses a shared key and is thus able to communicate with any STA which is the member of the ad-hoc network. FIG. 2 shows a state in which the STAs 20-1 and 30-3 can communicate with other STAs. However, even when the ad-hoc networks are constructed by different STAs, they can communicate with other STAs. The ad-hoc mode employs an active scanning method whereby a STA which wants to initiate any communication transmits a probe request frame and is able to communicate with a STA having responded with a probe response frame. Moreover, the ad-hoc mode employs a passive scanning method whereby each STA receives a beacon frame from another STA and is able to communicate with the STA. In the present invention, the communication methods in the ad-hoc mode are well known to those having ordinary skill in the art.

B. Configuration of STA

Figure 3:
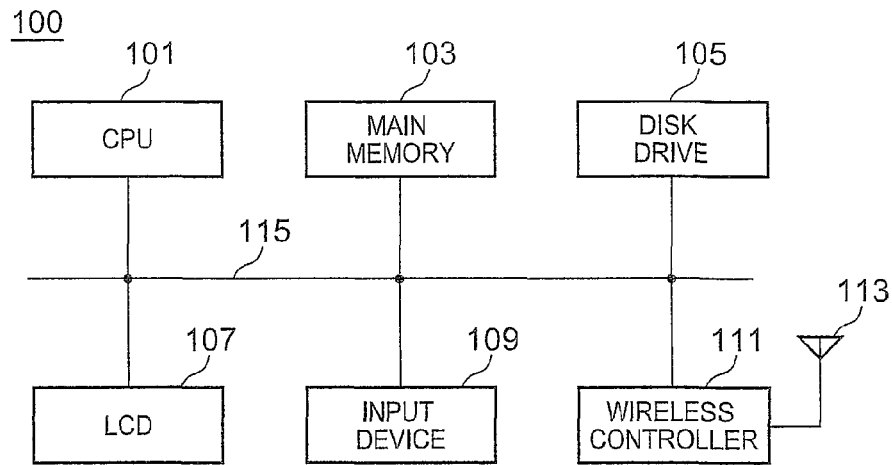
FIG. 3 is a block diagram showing a hardware configuration of a station.

FIG. 3 is a schematic block diagram showing a hardware configuration of each STA. A STA 100 is a laptop PC, but is not limited to this and may be a wireless terminal such as a PDA or a smart phone having the same function. The STA 100 includes a central processing unit (CPU) 101, a main memory 103, a disk drive 105, a liquid crystal display (LCD) 107, an input/output device 109, and a wireless controller 111 which are connected to a bus 115. A program according to the present embodiment is stored in the disk drive 105. An antenna 113 is connected to the wireless controller 111.

The wireless controller 111 operates as a transmitter and a receiver. The wireless controller 111 includes a buffer function when bidirectionally transmitting IP packets between the bus 115 and a wireless medium. The wireless controller 111 includes a protocol conversion function of appending a MAC header to an IP packet during transmission to generate an MAC frame and removing the MAC header from the MAC frame during reception. The wireless controller 111 also includes a function of encoding modulating data during transmission to output the data as high-frequency signals to the antenna 113 and a function of demodulating signals and performing error correction processing during reception. The functions of the wireless controller 111 are well known to those having ordinary skill in the art.

Figure 4:
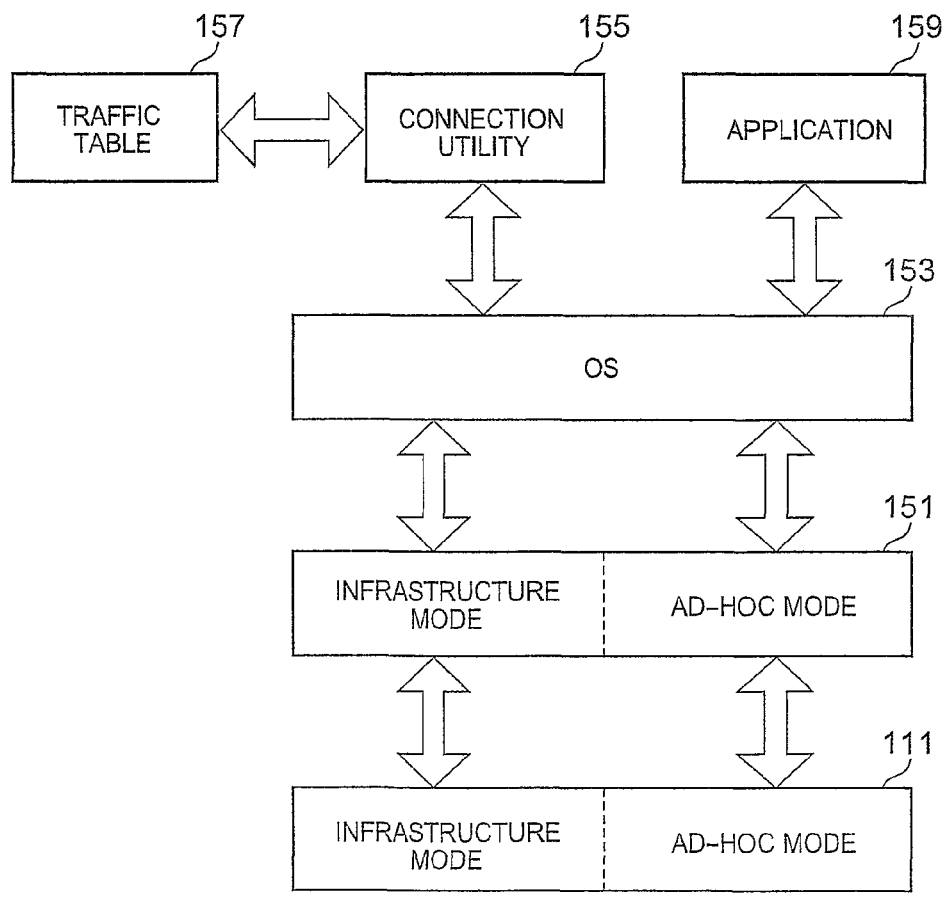
FIG. 4 is a diagram showing the software and hardware configuration for allowing each station to autonomously adjust the load of an access point.

FIG. 4 is a diagram showing the software and hardware configuration for allowing the STA 100 to autonomously adjust the load of an AP. A connection utility 155 is software including a well-known function of performing processing for connecting the STA 100 to an AP or allowing the STA 100 to roam to another AP. The connection utility 155 also includes a new function of autonomously adjusting the load of the AP by referring to a traffic table 157. The traffic table 157 is formed on a storage area on the main memory 103 in order to store the performance information representing the load performance of the respective APs and the connection information representing the connection state of STAs connected to an AP. The new function of the connection utility 155 and the data structure of the traffic table 157 will be described later. An application 159 is a web browser, a mailing software, or the like which operates on an operating system (OS) 153 so as to transmit and receive data to/from the server of the backbone network 11. The application 159 forms an application layer, a presentation layer, and a session layer of the OSI reference model.

The OS 153 may be Windows 7®. Windows 7 has a function called "Virtual WiFi" in which one wireless controller 111 is virtualized so as to function as multiple wireless controllers and a function called "Soft AP" of emulating the function of APs. A device driver 151 is a software that controls the operation of the wireless controller 111 and data transmission, and under the Windows 7, it can cause the wireless controller 111 to operate in the infra mode and the ad-hoc mode at the same time.

Therefore, for example, when the application 159 is communicating with the backbone network 11 using the infra mode of the wireless controller 111, the STA 100 can communicate with other STAs in the ad-hoc mode without disconnecting the session. The STA 100 may use an OS in which an infra mode wireless controller and an ad-hoc mode wireless controller are separately mounted, and the virtual function is not included. The OS 153 forms a transport layer and a network layer of the OSI reference model.

The device driver 151 is capable of measuring traffic which is the quantity of data transmitted per a unit period when the wireless controller 111 transmits and receives data to/from an AP. The connection utility 155 is capable of receiving periodically the present traffic from the device driver 151. The device driver 151 is capable of measuring the radio field intensity (RSSI) and the signal-to-noise ratio (SN ratio) of the beacon frame transmitted by an AP and transmitting the measured values to the connection utility 155. The RSSI and the SN ratio are parameters of communication quality that determines the transmission rate between an AP and an STA. The device driver 151 forms a data link layer of the OSI reference model. The wireless controller 111 forms a physical layer of the OSI reference model.

The connection utility 155, the traffic table 157, the OS 153, and the device driver 151 shown in FIG. 4 are loaded into the main memory 103 and executed by the CPU 101, thus realizing various functions in collaboration with the hardware of the STA 100. For example, the connection utility 155, the OS 153, and the device driver 151 constitute a means for acquiring the performance information of an AP, a means for communicating the connection information in the ad-hoc mode to exchange it with other STAs, or a means for determining a connecting destination AP based on the performance information and the connection information. These means are not limited to the configuration shown in FIG. 4, and a configuration in which other software and hardware or either one of them is added is also included within the scope of the present invention, so long as one having ordinary skill in the art can arbitrarily select the configuration.

It should be understood that FIGS. 3 and 4 only illustrate the primary hardware constructions related to the present embodiment and the connections in order to describe the present embodiment. In addition to the components described above, many other devices are used for the constitution of the STA 100. However, since these are well known to one having ordinary skill in the art, detailed explanations for them will not be provided here. Of course, multiple blocks shown in FIGS. 3 and 4 may form a single integrated circuit or device, or one block may be divided into multiple integrated circuits or devices, and these configurations are also included within the scope of the present invention, so long as one having ordinary skill in the art can arbitrarily select the configurations.

C. Data Structure of Traffic Table

Figure 6:
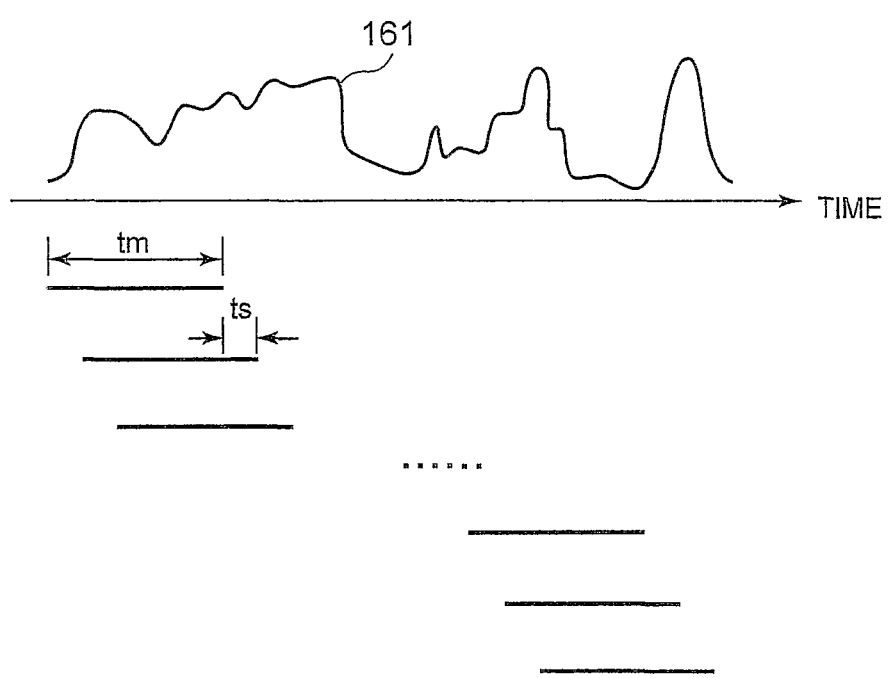
FIG. 6 is a diagram illustrating a method for determining average traffic from measured traffic.

FIG. 5 is a diagram showing a data structure of the traffic table 157 possessed by the STA 100. FIG. 6 is a diagram illustrating a method of calculating an average traffic (unit: bps) corresponding to the average quantity of data transmitted per a predetermined period of time by the connection utility 155 from the traffic measured by the device driver 151. It is assumed that the STA 100 presently belongs to the BSS 22.

In the traffic table 157, information about the AP 20 of the BSS 22 to which the STA 100 belongs and the AP 30 of the BSS 32 that forms the cell overlap area with the AP 20 are registered. The information includes an SSID, an MAC address, the maximum connectable number, a threshold connectable number, a throughput, and a threshold traffic. These data are directly acquired from an AP or provided in advance to respective STAs by a network administrator, and are stored in the disk drive 105. Alternatively, these data may be stored in the traffic table 157 on the main memory 103 by the STA 100 communicating with other STAs in the ad-hoc mode.

The SSID is a name on a network that the network administrator has assigned to an AP, and in some cases, it may be referred to as ESSID considering a case where there are multiple APs. The MAC address corresponding to the SSID is also referred to as a BSSID, and the STA 100 can acquire the MAC address from the beacon frame transmitted by an AP before connecting to the AP. Each STA forms the traffic table 157 on the main memory 103, and upon receiving the beacon frame from any one of the APs, the STA first stores the SSID and the MAC address thereof in the traffic table 157.

The maximum connectable number, the threshold connectable number, the throughput, and the threshold traffic are the performance information representing the performance of an AP and are determined uniquely for each AP. The performance information of each AP is stored in advance in the disk drive 105 of each STA so as to be correlated with the MAC address of the AP. Therefore, the connection utility 155 reads out the performance information corresponding to the MAC addresses of the APs 20 and 30 stored in the traffic table 157 from the disk drive 105 and stores the performance information in the traffic table 157. Alternatively, the STA 100 may receive the performance information from other STAs by communicating in the ad-hoc mode.

The performance information may be included in the management frame such as the beacon frame for the passive scanning method or the probe response frame for the active scanning method at the time of scanning an AP. Then, each STA may acquire the performance information before connecting to an AP and determine its connecting destination. Since a variable-length field (vendor specific) that can be freely used by a vendor is defined in such a management frame, the performance information can be included in the field. By allowing a STA to directly acquire the performance information from an AP, it is easy to cope with a change of an AP, and it is possible to eliminate a production step for storing the performance information in advance in each STA.

The maximum connectable number represents the upper limit of the number of STAs connectable to the AP in order to limit the number of IP addresses or maintain the traffic of each STA to be within a predetermined range. The threshold connectable number is a reference value that is set to be smaller than the maximum connectable number. The throughput represents the maximum transmission rate of an AP. The threshold traffic is a reference value that is set to be smaller than the throughput. The threshold connectable number and the threshold traffic are reference values which are set to each AP in order to allow a STA present in the cell overlap area to autonomously determine which one of the BSSs 22 and 32 it will newly participate in.

The threshold connectable number and the threshold traffic are also reference values which are set to the presently participating BSS 22 in order to allow the STA 100 present in the cell overlap area to autonomously determine whether it will roam from the participating BSS 22 to another BSS 32. Furthermore, the threshold connectable number and the threshold traffic are also reference values which are set to the roaming destination BSS 32 in order to allow the STA 100 present in the cell overlap area to autonomously determine whether it will roam from the participating BSS 22 to another BSS 32. Although the threshold connectable number and the threshold traffic are used for the above-mentioned three purposes, they may have different values in accordance with the purpose.

In the traffic table 157, an average traffic corresponding to the MAC addresses which are identifiers of the respective STAs connected to the AP 20 and an average traffic corresponding to the MAC addresses which are identifiers of the respective STAs connected to the AP 30 are stored. The identifier and the traffic are the connection information representing the connection states of the STAs. When the STA 100 connects to the AP 20 and is transmit data in response to the request of the application 159, the connection utility 155 periodically receives a traffic 161 (FIG. 6) from the device driver 151. Since the unit period of time when the device driver 151 calculates the traffic is relatively short, the traffic has a large variation and is not suitable as data to be used for calculating the total traffic for determining the size of load of the AP. The connection utility 155 observes the traffic received from the device driver 151 for a predetermined period tm and divides the total quantity of data transmitted during that period by the predetermined period tm, thus calculating the average traffic.

The connection utility 155 calculates the average traffic for each predetermined period is as a moving average. As an example, the predetermined period tm is 5 minutes, and the predetermined period ts is 1 minute. The STA 100 calculates the moving average traffic for 5 minutes every one minute and stores the moving average traffic so as to be correlated with its own MAC address of its own traffic table 157. Then, each STA notifies other STAs in the ad-hoc mode of its own average traffic whenever it is updated. Alternatively, each STA may acquire the latest average traffic by requesting to other STAs every predetermined period ts.

In the traffic table 157 of FIG. 5, the average traffic calculated by the STA 100 in this way and the average traffic of other STAs received from the other STAs are stored. The connection utility 155 calculates the total number of STAs presently connected to each AP and the sum of the average traffic of the respective STAs with respect to each AP from the MAC addresses and the average traffic which the connection utility 155 received from the respective STAs connected to the BSSs 22 and 32 through communication in the ad-hoc mode and stores the data in the traffic table 157. In the traffic table 157, for the AP 20 of which the threshold connectable number is 28 and of which the threshold traffic is 700, the present total connected number is 5, and the sum of the average traffic is 750. Moreover, for the AP 30 of which the threshold connectable number is 23 and of which the threshold traffic is 500, the present total connected number is 4, and the sum of the average traffic is 220.

In the traffic table 157, a roaming flag field is provided so as to correspond to the MAC address of each STA. When a STA having detected that there are multiple APs that can be connectable in the cell overlap area is connected to an AP having a weak radio field intensity based on the result of comparison between the threshold connectable number and the present total connected number or based on the result of comparison between the threshold traffic and the sum of average traffic, the STA sets its MAC address in the radio field. The roaming flag is used for allowing each STA to determine whether it is the subject of roaming when the STA later becomes able to perform roaming to an AP having a strong radio field intensity.

When there are three or more connectable APs, in order to specify a roaming destination AP, the identifier of an AP having a strong radio field intensity to which the STA was unable to connect at the time of newly participating in a BSS may be appended to the roaming flag. Moreover, when there are multiple STAs in which the roaming flag is set for the same AP to which the STAs were unable to connect, in order to determine the priority of roaming, a time stamp may be appended to the roaming flag so that they can perform roaming in the order that they were connected to the same AP having a weak radio field intensity. FIG. 5 shows a state where when the STA 43 autonomously determines to connect to the AP 30 having a weak radio field intensity since the sum of the average traffic of STAs with respect to the AP 20 having a strong radio field intensity exceeds the traffic threshold, and the STA 43 sets the roaming flag for itself. The performance information and the connection information stored in the traffic table 157 are shared between the respective STAs through the ad-hoc network, they are referred to as shared information.

D. Procedure of Load Adjustment when Newly Participating in BSS

Figure 7:
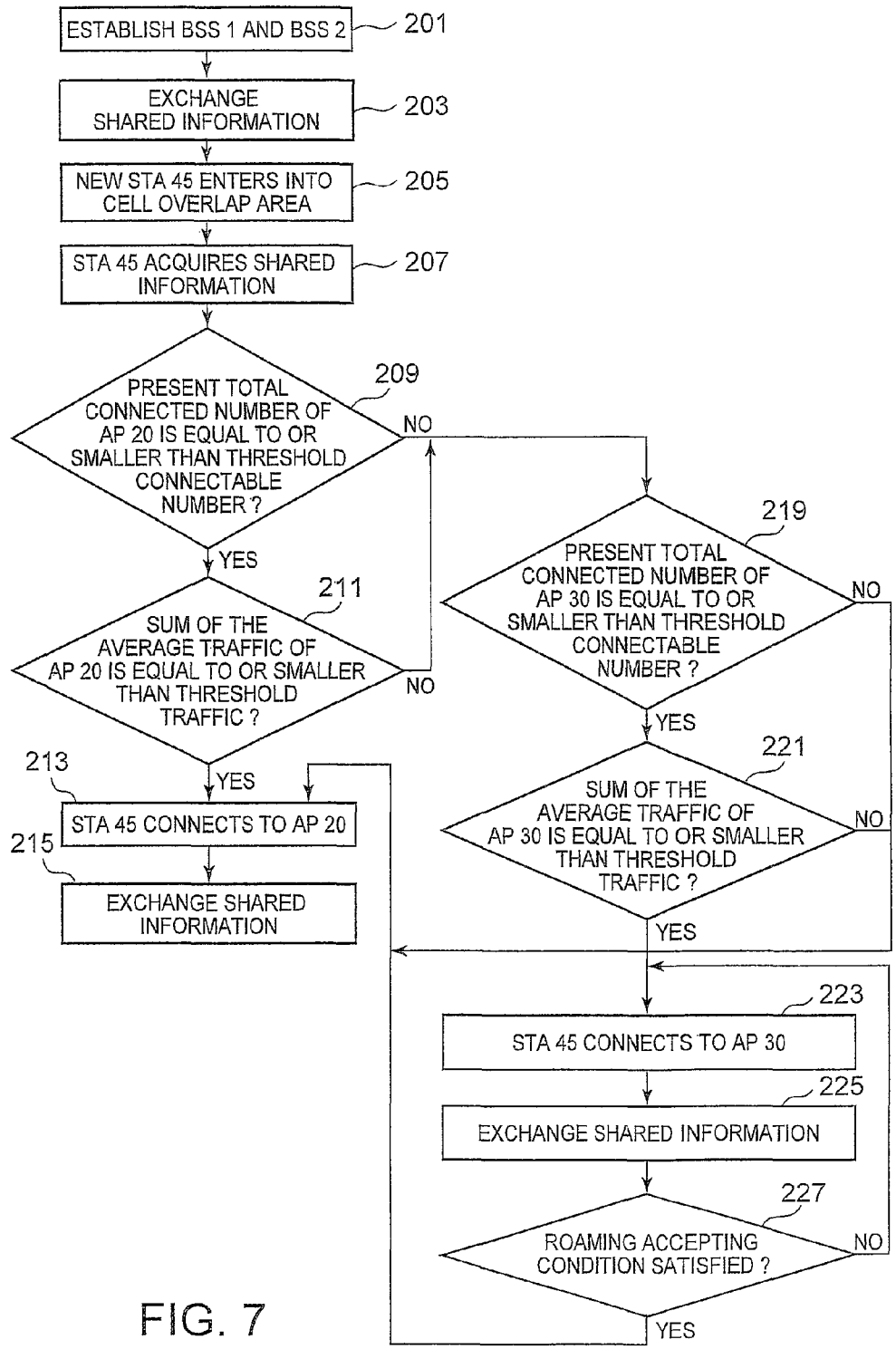
FIG. 7 is a flowchart showing a method of a station determining its own connecting destination when newly participating in a basic service set and adjusting the load of an access point.

FIG. 7 is a flowchart showing a method in which the STA 45 of FIG. 1 determines its own connecting destination AP when newly participating in the BSS 22 or 32 and adjusts the load of the AP. In block 201, as shown in FIG. 1, the BSSs 22 and 32 are constructed in the wireless LAN system 10. In block 203, each STA communicates the shared information stored in the traffic table 157 shown in FIG. 5 in the ad-hoc mode so as to update the shared information periodically. The shared information includes the performance information of the APs 20 and 30 which construct the ad-hoc network and to which the respective STAs are connected and the connection information of each STA. The connection utility 155 of the STA 45 which is not connected to any AP receives the beacon frames transmitted by APs and searches for a connectable AP. In block 205, the STA 45 enters into the cell overlap area of the BSSs 22 and 32.

Although the STA 45 may newly participate in a BSS from the cell exclusive area of the BSS 22 or 32, in that case, since there is no need to select a connecting destination AP, the load adjustment of an AP is not performed. The APs 20 and 30 transmit a beacon frame periodically. The beacon frame includes information such as the SSID of the AP, an available wireless channel, and a supporting transfer rate. The connection utility 155 of the STA 45 having moved into the cell overlap area receives the beacon frames transmitted by the APs 20 and 30 from the device driver 151 and recognizes the presence of the connectable APs 20 and 30 from their SSIDs. The device driver 151 measures the radio field intensities of the APs 20 and 30 from the received beacon frames and transmits the measured values to the connection utility 155.

When multiple connectable APs is detected, the connection utility 155 of the STA 45 is configured to communicate in the ad-hoc mode to acquire the shared information stored in the traffic table 157 from any one of the STAs before initiating the authentication for an AP having a strong radio field intensity as in the case of the related art. When the MAC addresses are acquired from the beacon frames of the APs 20 and 30, the STA 45 may read out the performance information of the APs 20 and 30 from its own disk drive 105 and store the data in the traffic table.

In block 207, the STA 45 establishes an ad-hoc network, communicates with any one of the STAs constituting the BSS 22 or 32 to acquire the shared information and store the same in its traffic table 157. Upon acquiring the shared information regarding the APs 20 and 30 that form the cell overlap area from any one of the STAs to which the STA 45 wants to connect, the connection utility 155 autonomously determines which AP the STA 45 will connect to in the following order.

Autonomous determination is defined as each STA makes its own decision based on only the shared information in the traffic table 157 without the support from a server or an AP connected to the backbone network 11.

The STA 45 determines that the radio field intensity of the beacon frame transmitted by the AP 20 is stronger than that of the AP 30. In block 209, the connection utility 155 first determines whether it is possible to connect to the AP 20 based on the threshold connectable number and the present total connected number of the AP 20 having a strong radio field intensity by referring to the traffic table 157. When the present total connected number is equal to or smaller than the threshold connectable number, the flow proceeds to block 211. In block 211, the connection utility 155 of the STA 45 determines whether or not the sum of the average traffic of the STAs connected to the AP 20 is equal to or smaller than the threshold traffic by referring to the traffic table 157. When the sum of the average traffic is equal to or smaller than the threshold traffic, the STA 45 determines that it is possible to connect to the AP 20 considering the load balance between the APs 20 and 30, and then, the flow proceeds to block 213. The STA 45 connects to the AP 20 in block 213, stores its own average traffic in the traffic table in block 215 and exchange the shared information with other STAs through communication in the ad-hoc mode.

When it is determined in block 209 that the present total connected number exceeds the threshold connectable number or when it is determined in block 211 that the sum of the average traffic exceeds the threshold traffic, the STA 45 determines that it is not possible to connect to the AP 20 considering the load balance between the APs 20 and 30, and the flow proceeds to block 219. In block 219, the connection utility 155 determines whether or not it is possible to connect to the AP 30 having a weak radio field intensity by referring to the traffic table 157. When the present total connected number of the AP 30 is equal to or smaller than the threshold connectable number, the flow proceeds to block 221. In block 221, the connection utility 155 of the STA 45 determines whether or not the sum of the average traffic of the STAs connected to the AP 30 is equal to or smaller than the threshold traffic by referring to the traffic table 157. When the sum of the average traffic of the respective STAs connected to the AP 30 is equal to or smaller than the threshold traffic, the STA 45 determines that it is possible to connect to the AP 30 considering the load balance, and the flow proceeds to block 223.

When it is determined in block 219 that the present total connected number of the AP 30 exceeds the threshold connectable number, or when it is determined in block 221 that the sum of the average traffic of the AP 30 exceeds the threshold traffic, the flow proceeds to block 213. The connection condition of the AP 20 is satisfied when the two conditions of blocks 209 and 211 are satisfied, and the connection condition of the AP 30 is satisfied when the two conditions of blocks 219 and 221 are satisfied. When the two connection conditions of the APs 20 and 30 are not satisfied, the STA 45 connects to the AP 20 in block 213. Even when the connection condition of the AP 20 is not satisfied, if the present total connected number is equal to or smaller than the maximum connectable number, and the sum of the average traffic is equal to or smaller than a throughput, it is possible to connect the STA 45 to the AP 20 although the respective STAs experience a decrease of traffic as a whole. When the two connection conditions of the APs 20 and 30 are not satisfied, it is preferable to connect the STA 45 to the AP 20 having a strong radio field intensity from the perspective of service rather than not connecting it to any of the APs 20 and 30.

According to the shared information in the traffic table 157 shown in FIG. 5, since the sum of the average traffic of the respective STAs connected to the AP 20 exceeds the threshold traffic, the connection condition of the AP 20 is not satisfied. On the other hand, since the present total connected number of the AP 30 is equal to or smaller than the threshold connectable number, and the sum of the average traffic is equal to or smaller than the threshold traffic, the connection condition of the AP 30 is satisfied. Therefore, the STA 45 autonomously determines that the AP 30 is its connecting destination AP. In block 223, the connection utility 155 of the STA 45 initiates connection to the AP 30. First, the STA 45 sends an authentication request by sending a management frame including its own MAC address to the AP 30. The AP 30 responds by performing authentication on the MAC layer such as shared key authentication or open authentication. Subsequently, the STA 45 sends an association request by sending a management frame to the AP 30.

When the STA 45 and the AP 30 set their communication parameters to complete association, the DHCP server of the AP 30 assigns an IP address to the STA 45. After that, the AP 30 asks the authentication server 13 for authentication of the STA 45, whereby the STA 45 is authenticated by the authentication server 13. When an encryption key used between the AP 30 and the STA 45 is sent from the authentication server 13 and set, the STA 45 is able to perform data communication with the backbone network 11, and its participation in the BSS 32 is finished. When the STA 45 is connected to the AP 30, the STA 45 sets a roaming flag in its own traffic table 157.

The application 159 of the STA 45 participating in the BSS 32 initiates data communication with a Web server connected to the backbone network 11 or other STAs connected to the AP 30. In block 225, the connection utility 155 receives the traffic information from the device driver 151, calculates the average traffic for the predetermined period tm, and stores the measured value in its traffic table 157 every predetermined period ts. As in the case of block 203, multiple STAs including the STA 45 exchange the shared information by periodically communicating in the ad-hoc mode.

When the present total connected number of STAs connected to the AP 20 is equal to or smaller than the maximum connectable number, the STA 45 is connected to the AP 20 having a strong radio field intensity. As a result, when the present total connected number of the AP 20 reaches the maximum connectable number, even if another STA of the BSS 22 is able to participate in the BSS 32, STAs will be unable to participate in the BSS 22 from the cell exclusive area of the AP 20. Moreover, due to the participation of the STA 45, the sum of the average traffic of the AP 20 reaches or exceeds the throughput of the AP 20, whereby the traffic of the STAs constituting the BSS 22 decreases as a whole. However, according to the above-described procedure, when the STA 45 determines that the AP 20 has a smaller margin than the AP 30 with respect to the present total connected number or the sum of the average traffic, since the STA 45 connects to the AP 30 having the larger margin, the above-described problem does not occur.

The conditions of blocks 209 and 211 correspond to the connection condition of the AP 20 having a strong radio field intensity, and the conditions of blocks 219 and 221 correspond to the connection condition of the AP 30 having a weak radio field intensity. When the two connection conditions of the AP 20 having a strong radio field intensity are satisfied, the STA 45 connects to the AP 20 having a strong radio field intensity. When one of the two connection conditions of the AP 20 having a strong radio field intensity is dissatisfied, and the two connection conditions of the AP 30 having a weak radio field intensity are satisfied, the STA 45 connects to the AP 30 having a weak radio field intensity. In some cases, the total connected number or the sum of the average traffic of the BSS 22 changes after the STA 45 is connected to the AP 30 having a weak radio field intensity.

Since the STA 45 can experience a higher transmission rate when it connects to the AP 20 having a strong radio field intensity unless it moves from the present position, when the AP 20 has a margin, it is preferable for the STA 45 to detect such a margin and perform roaming to the AP 20. In block 225, the STA 45 having the roaming flag set therein recognizes that it is the subject of roaming. When the roaming accepting condition of the AP 20 is satisfied, the STA 45 autonomously determines to perform roaming. The roaming accepting condition is satisfied when the total connected number of the AP 20 having a strong radio field intensity is equal to or smaller than the threshold connectable number, and the sum of the average traffic is equal to or smaller than the threshold traffic.

The roaming accepting condition is not related to the total connected number or the sum of the average traffic of the roaming originating AP 30 having a weak radio field intensity. When the roaming accepting condition is not satisfied, the flow returns to block 223, and the STA 45 maintains the connection to the AP 30. When the roaming accepting condition is satisfied, the flow proceeds to block 213, and the STA 45 changes its connecting destination AP from the AP 30 to the AP 20. The roaming as mentioned herein is different from normal roaming which occurs when the STA 45 moves so that the radio field intensity of the AP 30 weakens. In contrast, even when the STA 45 does not move, the roaming as mentioned herein occurs in accordance with changes in both or either one of the total connected number and the sum of the average traffic of the roaming destination AP 20 having a strong radio field intensity.

In the description above, although a case where the cell overlap area is formed by two cells has been described as an example, the above-described procedure can be applied to a case where the cell overlap area is formed by three or more cells. In this case, the STA repeats the procedures of determining as to the connection conditions in blocks 209 and 211, and 219 and 221, of the APs in descending order of the radio field intensity by referring to the traffic table 157, selects an AP having the greatest radio field intensity among the APs satisfying the connection conditions by its own decision, and connects to the selected AP.

The threshold connectable number and the threshold traffic used in the connection conditions of blocks 209 and 211 or blocks 219 and 221 may have different values from those of the threshold connectable number and threshold traffic used in the roaming accepting condition used in block 227. In this case, it is preferable to take measures as necessary so that the threshold value of the roaming accepting condition is smaller than the threshold value of the connection condition, thus making the roaming condition stricter than the connection condition. This is to prevent the margin in the performance and load of the two APs from being reversed by the roaming.

E. Procedure of Load Adjustment after Having Participated in BSS

In multiple BSS that shares a cell overlap area, it is ideal to maximize the traffic of the respective STAs constituting all multiple BSS as a whole. Moreover, it is preferable that all the BSS can take measures so as to prevent the occurrence a situation in which a STA participating in a BSS from a cell exclusive area is unable to connect to the BSS due to the limitation on the total connected number of an AP. On the other hand, an STA having already connected to any one of the APs generally will not disconnect its connection to the AP unless the STA stops operating or moves out of the cell coverage even when it does not perform wireless communication. Moreover, the traffic of the respective STAs connected to an AP changes with time in accordance with a change of the user's work, and an unbalance of load such that one BSS has a large load and the other BSS has a small load may occur. The STA according to the present invention can autonomously solve such a problem by using the shared information.

Detailed description will be provided by way of the wireless LAN system 10 shown in FIG. 1. If the radio field intensity of the AP 20 is stronger than the AP 30, and the sum of the average traffic of the AP 20 is sufficiently smaller than the throughput, it can be said that it is preferable for the STA 41 present in the cell overlap area of the BSSs 22 and 32 to connect to the AP 20 since the transmission rate can be improved. However, if the sum of the average traffic of the AP 20 gets close to the throughput, the average traffic of the respective STAs constituting the BSS 22 decrease as a whole. In this case, if the sum of the average traffic of the AP 30 is sufficiently smaller than the throughput, by allowing the STA 41 to perform roaming to the AP 30, it is possible to improve the traffic of the BSS 22 without causing a decrease in the traffic of the respective STAs of the BSS 32. Moreover, if thirty STAs are connected to the BSS 22, and the STA 41 roams to the AP 30 so that the total connected number of the BSS 22 becomes 29, the STA 45 can newly participate in the BSS 22 from the cell exclusive area.

Figure 8:
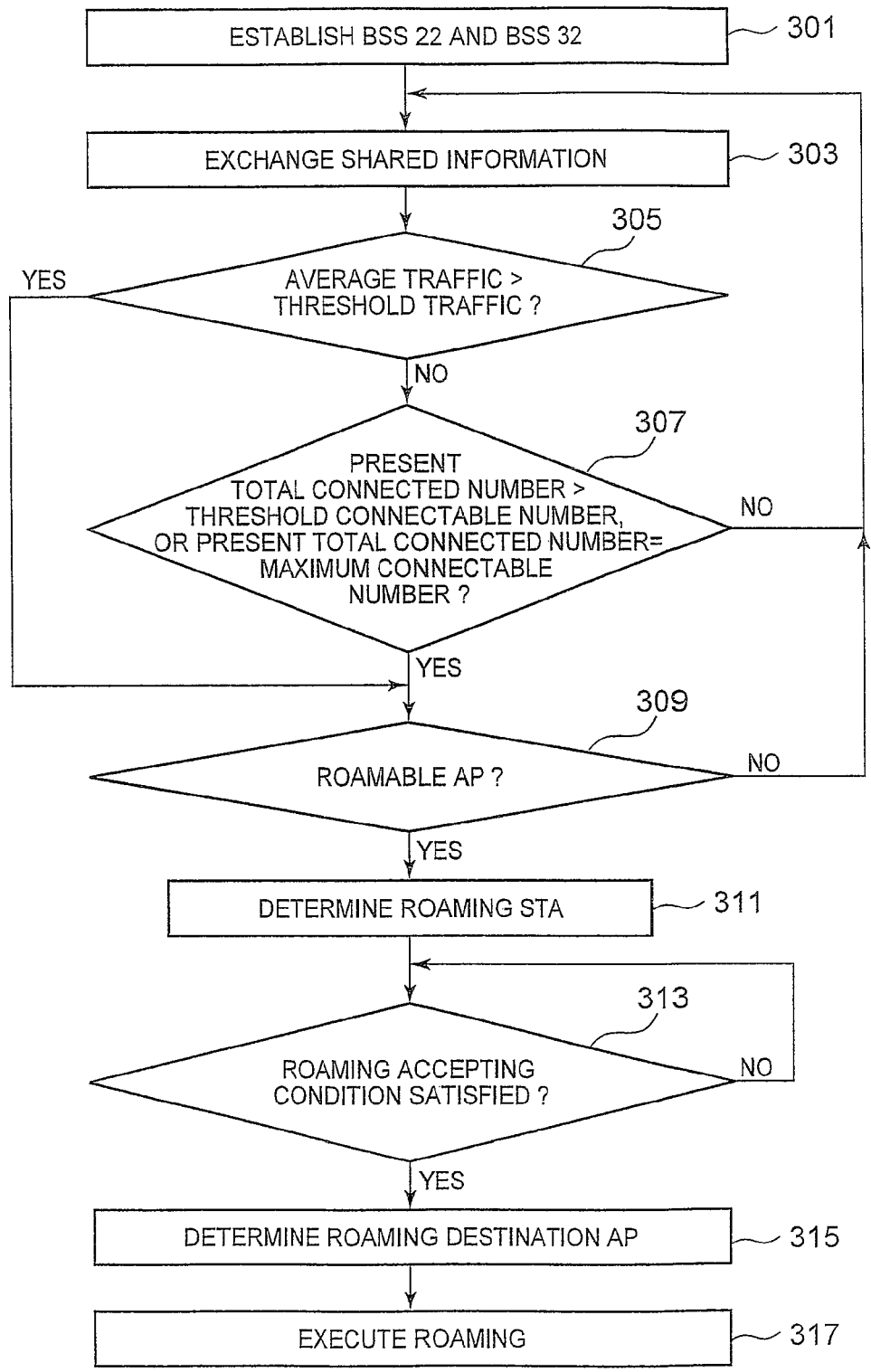
FIG. 8 is a flowchart showing the procedure in which a STA having already participated in a basic service set autonomously performs roaming and adjusts the load of an access point.

FIG. 8 is a flowchart showing a method in which a STA having already participated in a BSS autonomously performs roaming and adjusts the load of an AP. In this method, as an example, the STA 41 autonomously determines whether or not to perform roaming based on the performance information and the connection information of the AP 20 to which the STA 41 is presently connected and the performance information and the connection information of the AP 30 to which the STA 41 can roam. Normal roaming occurs when the STA 41 moves so that the radio field intensity of the presently connected AP 20 decreases. The roaming in this procedure is performed based on the sum of the average traffic or the present total connected number of the BSS 22 regardless of the movement of the STA 41. In block 301, as shown in FIG. 1, the BSSs 22 and 32 are constructed in the wireless LAN system 10. In block 303, the respective STAs constituting the BSSs 22 and 32 periodically exchange the shared information and store the shared information in their traffic table 157.

In block 305, the STA 41 determines whether or not the sum of the average traffic of its connected AP 20 exceeds the threshold traffic by referring to the traffic table 157. When the sum exceeds the threshold traffic, the flow proceeds to block 309 since there is a possibility that the traffic of the respective STAs decrease if the sum of the average traffic of the AP 20 increases further.

When the sum of the average traffic is equal to or smaller than the threshold traffic, the flow proceeds to block 307, and the STA 41 determines whether or not the present total connected number of its connected AP exceeds the threshold connectable number or reaches the maximum connectable number. When the present total connected number exceeds the threshold connectable number or reaches the maximum connectable number, the flow proceeds to block 309. When the present total connected number is equal to or smaller than threshold connectable number or smaller than the maximum connectable number, the flow returns to block 303, and the STA 41 does not perform roaming until any one of the conditions of blocks 305 and 307 is satisfied. The conditions of blocks 305 and 307 are the roaming conditions set for the roaming originating BSS 22, and when any one of the conditions is satisfied, the roaming condition of the AP 20 is satisfied.

In block 309, the STA 41 determines whether or not it has a roamable AP to which it can roam. A STA which possesses a roamable AP is a STA which is present in the cell overlap area and which has detected the SSIDs of multiple connectable APs. Since the STA 41 has the roamable AP 30, the flow proceeds to block 311. If all STAs are present in the cell exclusive areas and do not possess the roamable AP, no STA performs roaming from the BSSs 22 and 32, and the flow returns to block 303. Then, the respective STAs make determination as to the roaming condition again after updating the shared information.

In the wireless LAN system 10 of FIG. 1, although the STAs 41 and 43 are present in the cell overlap area and can perform roaming, it is assumed that the BSS 22 satisfies the roaming condition of the roaming originating BSS whereas the BSS 32 does not satisfy the roaming condition. In block 311, the STA 41 (hereinafter referred to as a roamable STA) which is connected to the AP 20 satisfying the roaming condition and which possesses a roamable AP determines whether or not it is the STA that performs the current roam. When there is one roamable STA, the STA determines that it is the STA that performs the current roaming.

Since the BSS 22 has only one roamable STA 41, the STA 41 determines that it is the subject of roaming. When there is multiple roamable STAs, the connection utility 155 of each STA autonomously determines whether it is the subject of roaming by referring to the traffic table 157. When the roaming condition of block 305 regarding the sum of the average traffic is satisfied, a STA having the most average traffic among the multiple roamable STAs may determine that it is the subject of roaming in order to decrease the sum of the average traffic.

Alternatively, a predetermined number of STAs as counted in ascending order of the average traffic among the multiple roamable STAs may deter mine that they are the subjects of roaming. In the case of the former method, the corresponding STA is best effective for decreasing the traffic of the AP, whereas the latter method provides advantages in that the corresponding STA has little influence on the interruption of traffic due to the roaming. When the roaming condition of block 307 regarding the present total connected number is satisfied, it is preferable that a STA having the smallest average traffic among the multiple roamable STAs may determine that it is the subject of roaming in order to decrease the total connected number without affecting the traffic of a roaming STA.

For the roaming to be effective in adjusting the load of an AP, it is necessary to ensure that the roaming has little influence on the throughput and the maximum connectable number of a roaming destination AP. In block 313, the STA 41 having determined to be the subject of roaming determines whether or not the roaming accepting condition of a roamable AP is satisfied. The roaming accepting condition is satisfied when the present total connected number of the roamable AP 30 is equal to or smaller than the threshold connectable number, and the sum of the average traffic is equal to or smaller than the threshold traffic. When there is no BSS satisfying the roaming accepting condition, the STA 41 does not perform roaming.

The roaming condition and the roaming accepting condition are determined based on the comparison between the threshold traffic and the sum of the average traffic and the comparison between the threshold connectable number and the present total connected number. Here, it is preferable that the threshold traffic and the threshold connectable number of the roaming condition are set to be different from those of the roaming accepting condition so that the relationship of the performance information and the connection information in the roaming originating source and the roaming destination, namely the relationship of the margin in load is not reversed by the roaming. For example, when the performances of the roaming originating AP and the roaming destination AP are the same, by setting the threshold traffic and the threshold connectable number of the roaming destination so as to be smaller than those of the roaming originating source, it is possible to reduce the influence on STAs belonging to the roaming destination AP although the load on the roaming destination AP is increased by the roaming. When the roaming originating AP and the roaming destination AP have different performances, by setting the threshold traffic and the threshold connectable number considering the performances of the respective APs, it is possible to prevent the load margin from being reversed.

In block 315, a roaming destination AP is determined. When there is only one AP that satisfies the roaming accepting condition, for example the AP 30 as shown in FIG. 1, the connection utility 155 of the STA 41 determines the AP 30 as the roaming destination. When there is multiple APs that satisfy the roaming accepting condition, the connection utility 155 needs to select any one of the APs.

When the roaming originating AP satisfies the roaming condition of block 305 regarding the sum of the average traffic, and the STA having the most average traffic is determined to be the subject of roaming in block 311, an AP which has the greatest radio field intensity, has the best communication quality as measured by the SN ratio, or has the greatest difference between the threshold traffic and the sum of the average traffic can be determined as the roaming destination AP. Moreover, when the roaming originating AP satisfies the roaming condition of block 307 regarding the present total connected number, and the STA having the smallest average traffic is determined to be the subject of roaming in block 311, an AP which has the greatest difference between the threshold connectable number and the present total connected number can be determined as the roaming destination AP.

When the STA 41 having determined to perform roaming selects the AP 30 as the roaming destination AP, the connection utility 155 of the STA 41 changes the wireless channel frequency to change the connecting destination from the AP 20 to the AP 30 while maintaining the present session with the AP 20 by a well-known procedure in block 317. Following the roaming, the DHCP server of the AP 20 withdraws the IP address assigned to the STA 41 in order to assign the IP address to a new participating STA. Moreover, the DHCP server of the AP 30 assigns a new IP address to the STA 41.

When roaming, the STA 41 communicates with other STAs in the ad-hoc mode to declare that it is going to perform roaming, whereby it is possible to securely prevent the occurrence of a situation in which other STAs determine that they are the subjects of roaming based on the subsequent changes in average traffic. Moreover, the STA 41 may make a final decision on roaming based on the latest shared information acquired from other STAs in the ad-hoc mode immediately before roaming. When the STA 41 has roamed from the AP 20 to the AP 30, the sum of the average traffic of the BSS 22 decreases, whereby the respective remaining STAs can maintain communication using a predetermined traffic, and it is possible to ensure the connection of a STA that newly participates in the BSS 22 from the cell exclusive area.

As has been described, the present invention provides a method for allowing a wireless portable computer to adjust the load of a wireless base station autonomously.

Those skilled in the art will appreciate that the mechanisms of the present invention are capable of being distributed as a computer program product in a variety of computer-readable storage device such as compact discs, digital versatile discs, etc.

While the invention has been particularly shown and described with reference to a preferred embodiment, it will be understood by those skilled in the art that various changes in form and detail may be made therein without departing from the spirit and scope of the invention.

What is claimed is:

1. A method comprising:
    acquiring by a laptop computer performance information representing performances of a plurality of wireless base stations that forms a cell overlap area to which a plurality of wireless terminals is connected, wherein said performance information is acquired from respective wireless base stations through a management frame;
    before connecting to any one of said wireless base stations in said cell overlap area, communicating in an ad-hoc mode with said wireless terminals to receive connection information representing respective connection states of said wireless terminals to said wireless base stations, wherein said laptop computer is configured to communicate in an infrastructure mode and in said ad-hoc mode to allow said laptop computer to connect to any one of said wireless base stations;
    selecting one of said wireless base stations as a candidate for making a wireless connection based on said performance information and said connection information; and
    connecting said laptop computer to said selected one wireless base station.

2. The method of claim 1, wherein said acquiring further includes acquiring said performance information by communicating in said ad-hoc mode with other wireless terminals before connecting to any one of said wireless base stations in said cell overlap area.

3. The method of claim 1, wherein said selecting is performed based on said performance information and the total traffic of respective wireless terminals with respect to a specific wireless base station.

4. The method of claim 1, wherein said connection information includes identifiers of said wireless terminals and the traffic of respective wireless terminals to said wireless base stations.

5. The method of claim 1, wherein said, method further includes providing a traffic table to store said performance information and said connection information.

6. The method of claim 5, wherein said method further includes periodically storing its own connection information in said traffic table.

7. The method of claim 1, wherein when said laptop computer is connected to a wireless base station having a weaker radio field intensity among said wireless base stations based on said performance information and said connection information,
    periodically communicating in said ad-hoc mode with other wireless terminals connected to a wireless base station having a stronger radio field intensity to acquire said connection information of said other wireless terminals;
    determining whether or not a roaming accepting condition is satisfied based on said performance information of said wireless base station having a stronger radio field intensity and said connection information of respective wireless terminals connected to said wireless base station having a stronger radio field intensity; and roaming to said wireless base station having a stronger radio field intensity when said roaming accepting condition is satisfied.

8. A computer-readable storage device comprising:
program code for acquiring performance information representing performances of a plurality of wireless base stations that forms a cell overlap area to which a plurality of wireless terminals is connected, wherein said performance information is acquired from respective wireless base stations through a management frame;
program code for, before connecting to any one of said wireless base stations in said cell overlap area, communicating in an ad-hoc mode with said wireless terminals to receive connection information representing respective connection states of said wireless terminals to said wireless base stations, wherein a laptop computer is configured to communicate in an infrastructure mode and in said ad-hoc mode to allow said laptop computer to connect to any one of said wireless base stations;
program code for selecting one of said wireless base stations as a candidate for making a wireless connection based on said performance information and said connection information; and
program code for connecting said laptop computer to said selected wireless base station.

9. The computer-readable storage device of claim 8, wherein said program code for acquiring further includes program code for acquiring said performance information by communicating in said ad-hoc mode with other wireless terminals before connecting to any one of said wireless base stations in said cell overlap area.

10. The computer-readable storage device of claim 8, wherein said program code for selecting is performed based on said performance information and the total traffic of respective wireless terminals with respect to a specific wireless base station.

11. The computer-readable storage device of claim 8, wherein said connection information includes identifiers of said wireless terminals and the traffic of respective wireless terminals to said wireless base stations.

12. The computer-readable storage device of claim 8, wherein said computer-readable storage device further includes program code for providing a traffic table to store said performance information and said connection information.

13. The computer-readable storage device of claim 12, wherein said computer-readable storage device further includes program code for periodically storing its own connection information in said traffic table.

14. The computer-readable storage device of claim 8, wherein said computer-readable storage device further includes when said laptop computer is connected to a wireless base station having a weaker radio field intensity among said wireless base stations based on said performance information and said connection information,
program code for periodically communicating in said ad-hoc mode with other wireless terminals connected to a wireless base station having a stronger radio field intensity to acquire said connection information of said other wireless terminals;
program code for determining whether or not a roaming accepting condition is satisfied based on said performance information of said wireless base station having a stronger radio field intensity and said connection information of respective wireless terminals connected to said wireless base station having a stronger radio field intensity; and
program code for roaming to said wireless base station having a stronger radio field intensity when said roaming accepting condition is satisfied.

15. A laptop computer comprising:
a memory having a traffic table for storing performance information representing performances of a plurality of wireless base stations that form a cell overlap area to which a plurality of wireless terminals is connected. and for storing connection information representing respective connection states of said wireless terminals to said wireless base stations, wherein said connection information includes identifiers of said wireless terminals and the traffic of respective wireless terminals to said wireless base stations;
a wireless controller having an antenna for
acquiring said performance information;
before connecting to any one of said wireless base stations in said cell overlap area, for communicating in an ad-hoc mode with said wireless terminals to receive said connection information, wherein said laptop computer is configured to communicate in an infrastructure mode and in said ad-hoc mode to allow said laptop computer to connect to any one of said wireless base stations; and
a processor for selecting one of said wireless base stations as a candidate for making a wireless connection based on said performance information and said connection information to allow said wireless controller to connect said laptop computer to said selected one wireless base station.

16. The laptop computer of claim 15, wherein said wireless controller acquires said performance information by communicating in said ad-hoc mode with other wireless terminals before connecting to any one of said wireless base stations in said cell overlap area.

17. The laptop computer of claim 15, wherein said processor performs said selection based on said performance information and the total traffic of respective wireless terminals with respect to a specific wireless base station.

* * * * *